US012470038B2

(12) United States Patent
Seguin et al.

(10) Patent No.: US 12,470,038 B2
(45) Date of Patent: Nov. 11, 2025

(54) PULSE EQUALIZATION IN Q-SWITCHED GAS LASERS

(71) Applicant: Coherent, Inc., Santa Clara, CA (US)

(72) Inventors: Vernon Seguin, Windsor, CT (US); David P. Schmelzer, West Hartford, CT (US); Joel Fontanella, Tolland, CT (US); Peter Rosenthal, West Simsbury, CT (US)

(73) Assignee: Coherent, Inc., Santa Clara, CA (US)

( * ) Notice: Subject to any disclaimer, the term of this patent is extended or adjusted under 35 U.S.C. 154(b) by 424 days.

(21) Appl. No.: 17/976,642

(22) Filed: Oct. 28, 2022

(65) Prior Publication Data

US 2023/0155342 A1 May 18, 2023

Related U.S. Application Data (60) Provisional application No. 63/281,044, filed on Nov. 18, 2021.

(51) Int. Cl.
*H01S 3/136* (2006.01)
*H01S 3/117* (2006.01)
(Continued)

(52) U.S. Cl.
CPC .............. *H01S 3/136* (2013.01); *H01S 3/117* (2013.01); *H01S 3/1305* (2013.01); *H01S 3/2232* (2013.01)

(58) Field of Classification Search
CPC ...... H01S 3/1068; H01S 3/117; H01S 3/1305; H01S 3/136; H01S 3/2232
See application file for complete search history.

(56) References Cited

U.S. PATENT DOCUMENTS 3,517,332 A * 6/1970 De Maria ................. G02F 1/11
359/305
5,197,074 A * 3/1993 Emmons, Jr. ........... H01S 3/136
372/12

(Continued)

FOREIGN PATENT DOCUMENTS

EP 2056414 B1 10/2015

OTHER PUBLICATIONS

International Search Report and Written Opinion received for International Patent Application No. PCT/US2022/078772 mailed on Mar. 2, 2023, 12 pages.

*Primary Examiner* — Michael Carter
(74) *Attorney, Agent, or Firm* — Morrison & Foerster LLP (57) ABSTRACT

A Q-switched gas laser apparatus with bivariate pulse equalization includes a gas laser, a sensor, and an electronic circuit. A Q-switch that switches the laser resonator between high-loss and low-loss states to generate a pulsed laser beam. The sensor obtains a measurement of the pulsed laser beam indicative of the laser pulse energy. The electronic circuitry operates the Q-switch to (a) repeatedly switch the laser resonator between the high-loss and low-loss states to set a repetition rate of laser pulses of the pulsed laser beam, (b) adjust a loss level of the low-loss state, based on the pulse energy measurement, to achieve a target laser pulse energy, and (c) adjust a duration of the low-loss state to achieve a target laser pulse duration. By adjusting both pulse energy and duration, uniform pulse energy and, if desired, uniform pulse duration are achieved over a wide range of repetition rates.

17 Claims, 9 Drawing Sheets

(51) Int. Cl.
*H01S 3/13* (2006.01)
*H01S 3/223* (2006.01)

(56) References Cited

U.S. PATENT DOCUMENTS

| | | | |
|---|---|---|---|
| 5,204,867 A * | 4/1993 | Koschmann | H01S 3/136 |
| | | | 372/38.03 |
| 5,339,323 A * | 8/1994 | Hunter | H01S 3/136 |
| | | | 372/30 |
| 5,982,790 A | 11/1999 | Grossman et al. | |
| 6,038,241 A | 3/2000 | von Elm et al. | |
| 6,826,204 B2 | 11/2004 | Kennedy et al. | |
| 7,027,199 B2 | 4/2006 | Johnson | |
| 2002/0185474 A1 | 12/2002 | Dunsky et al. | |
| 2005/0069007 A1 * | 3/2005 | Kennedy | B23K 26/0624 |
| | | | 372/83 |
| 2015/0246848 A1 | 9/2015 | Ikenoue et al. | |

\* cited by examiner

PULSE EQUALIZATION IN Q-SWITCHED GAS LASERS

PRIORITY

This application claims priority to U.S. Provisional Application Ser. No. 63/281,044, filed Nov. 18, 2021, the disclosure of which is incorporated by reference in its entirety.

TECHNICAL FIELD OF THE INVENTION

The present invention relates to Q-switched gas lasers, such as Q-switched carbon dioxide ($CO_2$) and carbon monoxide (CO) lasers. The present invention relates in particular to changes in laser pulse energy and laser pulse duration of the output of a Q-switched gas laser upon modification of the pulse repetition rate.

DISCUSSION OF BACKGROUND ART

The laser gain medium of a gas laser is a gas mixture. The optically-active entities providing the laser action are atoms, ions, or molecules. These optically-active entities are usually energized by a high-voltage electric field, either radio-frequency (RF) or direct-current (DC), that generates a gas discharge and thereby produces a population inversion in the optically-active entities. Many gas lasers have been replaced in commercial applications by solid-state lasers, owing to their generally higher efficiency, smaller size, lower cost, and simpler operation. However, certain types of gas lasers remain popular and are the preferred solution for some laser applications. For example, $CO_2$ lasers and CO lasers see substantial use in industrial processes, such as laser machining, where their infrared (IR) wavelength and high average power are advantageous.

$CO_2$ lasers can deliver IR laser radiation within the wavelength range from about 9 micrometers ($\mu m$) to about 11 $\mu m$, whereas CO lasers can deliver IR laser radiation within the wavelength range from about 4.5 $\mu m$ to about 6.0 $\mu m$. Average powers as high as about 8 kilowatts can be obtained with $CO_2$ lasers and CO lasers.

Many laser machining applications require that the laser radiation is pulsed. In the case of $CO_2$ and CO lasers, a pulsed laser beam may be generated by turning on and off the gas discharge in the gain medium. However, the rise and fall times of the laser pulses generated by this technique are dictated by the kinetics of the energy transfer processes in the gas mixture and are typically of order 10 to 200 microseconds ($\mu s$). These rise and fall times result in an overall laser pulse duration in the range of tens to hundreds of microseconds, which is too long for certain applications. In particular, these laser pulse durations are too long in many laser machining applications where it is required that the heat-affected zone in the irradiated material is small. When the laser pulse duration is tens of microseconds or more, thermal diffusion in the irradiated material during a single laser pulse causes the heat-affected zone to grow significantly in directions away from the irradiated location. Even for applications that do not require shorter laser pulses, modulation of the gas discharge has the additional drawback that the associated thermal variation leads to optical instabilities.

Q-switching is a technique for generating a laser pulses by modulating the intracavity loss of the laser resonator. Q-switching switches the laser resonator between a high-loss state (low Q-factor) and a low-loss state (high Q-factor), while maintaining steady pumping of the laser gain medium.

A laser pulse is generated by first operating the laser resonator in the high-loss state to prevent lasing action. In the absence of lasing action, the pumping of the gain medium results in the accumulation of a large amount of energy in the laser gain medium. Next, the resonator loss is abruptly dropped to a low value that enables laser action. After a build-up time, the circulating laser power increases rapidly in this low-loss state and the stored energy is depleted quickly. The outcome is the generation of a laser pulse, typically with a duration in the nanosecond range. Most commonly, Q-switching is performed periodically to generate a train of laser pulses characterized by a pulse repetition rate.

Q-switching may be active or passive. In active Q-switching, the laser resonator includes an active loss element, for example an acousto-optic modulator (AOM) or an electro-optic modulator (EOM), that is controlled to either divert or not divert radiation from the resonator to switch the laser resonator between high-loss and low-loss states. Active Q-switching is typically used to generate laser pulses with a pulse repetition rate in the range from a few hundred kilohertz (kHz) down to one kHz or lower. Active Q-switching may be used to generate a single laser pulse on demand.

A laser process performed with a pulsed laser beam typically has an optimal pulse repetition rate. The optimal pulse repetition rate depends on the process. Therefore, the most versatile pulsed laser systems are capable of running at a range of pulse repetition rates, sometimes spanning from single-shot to a few hundred kilohertz. It is not uncommon for laser machining processes to entail varying the pulse repetition rate during processing of each single part, thus requiring on-the-fly adjustment of the pulse repetition rate. In the case of a Q-switched laser, adjustment of the pulse repetition rate amounts to changing the duration of the high-loss state of the laser resonator. At least for relatively high pulse repetition rates, such change can affect the amount of energy accumulated in the gain medium before switching to the low-loss state. Consequently, adjustment of the pulse repetition rate may be accompanied by a changed laser pulse energy.

SUMMARY OF THE INVENTION

Disclosed herein are a Q-switched gas laser apparatus and associated method with bivariate pulse equalization of both laser pulse energy and laser pulse duration. The present apparatus and method utilize active Q-switching and are configured to equalize laser pulse energy and duration over a wide range of pulse repetition rates. One equalization mechanism directly affects the laser pulse energy, while another equalization mechanism directly affects the laser pulse duration. The pulse-energy-equalization mechanism adjusts the loss of the low-loss state of the laser resonator, while the pulse-duration-equalization mechanism adjusts the duration of the low-loss state. For example, when the Q-switch is an AOM, the pulse-duration-equalization mechanism is based on maintaining some amount of diffraction even in the low-loss state, and adjusting this amount of diffraction to achieve a desired pulse energy. For comparison, a conventional Q-switch is turned off entirely during the low-loss state to minimize the loss of the laser resonator.

We have realized that equalization of both pulse energy and duration extends the pulse repetition rate range over which uniform pulse energy may be achieved. While it may be possible to achieve uniform pulse energy over a limited range of relatively high pulse repetition rates by using only the pulse-energy-equalization mechanism, the pulse-duration-equalization mechanism facilitates extension of this range to lower pulse repetition rates. Thus, the present bivariate pulsed equalization is useful even when the objective is simply to maintain a uniform laser pulse energy over a wide range of pulse repetition rates, regardless of the laser pulse duration. The pulse-duration-equalization mechanism further enables achieving a desired laser pulse duration over a wide range of pulse repetition rates, thereby providing ultimate laser pulse control.

In one aspect, a Q-switched gas laser apparatus with pulse equalization includes a gas laser, a sensor, and an electronic circuit. The gas laser includes a laser resonator having a Q-switch operable to switch the laser resonator between a high-loss state and a low-loss state to generate a pulsed laser beam. The sensor is configured to obtain a measurement of the pulsed laser beam indicative of a laser pulse energy. The electronic circuit is communicatively coupled between the Q-switch and the sensor, and is configured to operate the Q-switch to (a) repeatedly switch the laser resonator between the high-loss and low-loss states to set a repetition rate of laser pulses of the pulsed laser beam, (b) adjust a loss level of the low-loss state, based on the measurement obtained by the sensor, to achieve a target laser pulse energy, and (c) adjust a duration of the low-loss state to achieve a target laser pulse duration.

In another aspect, a method for equalizing laser pulses generated by a Q-switched gas laser includes operating a Q-switch of the Q-switched gas laser to repeatedly switch a laser resonator of the Q-switched gas laser between high-loss and low-loss states to generate a pulsed laser beam. The method further includes equalizing laser pulse energy and laser pulse duration of laser pulses of the pulsed laser beam through repeated steps of (a) sampling the pulsed laser beam to obtain a measurement indicative of the laser pulse energy, (b) adjusting a loss level of the low-loss state, based on the measurement indicative of the laser pulse energy, to approach a target laser pulse energy, and (c) adjusting a duration of the low-loss state to approach a target laser pulse duration.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
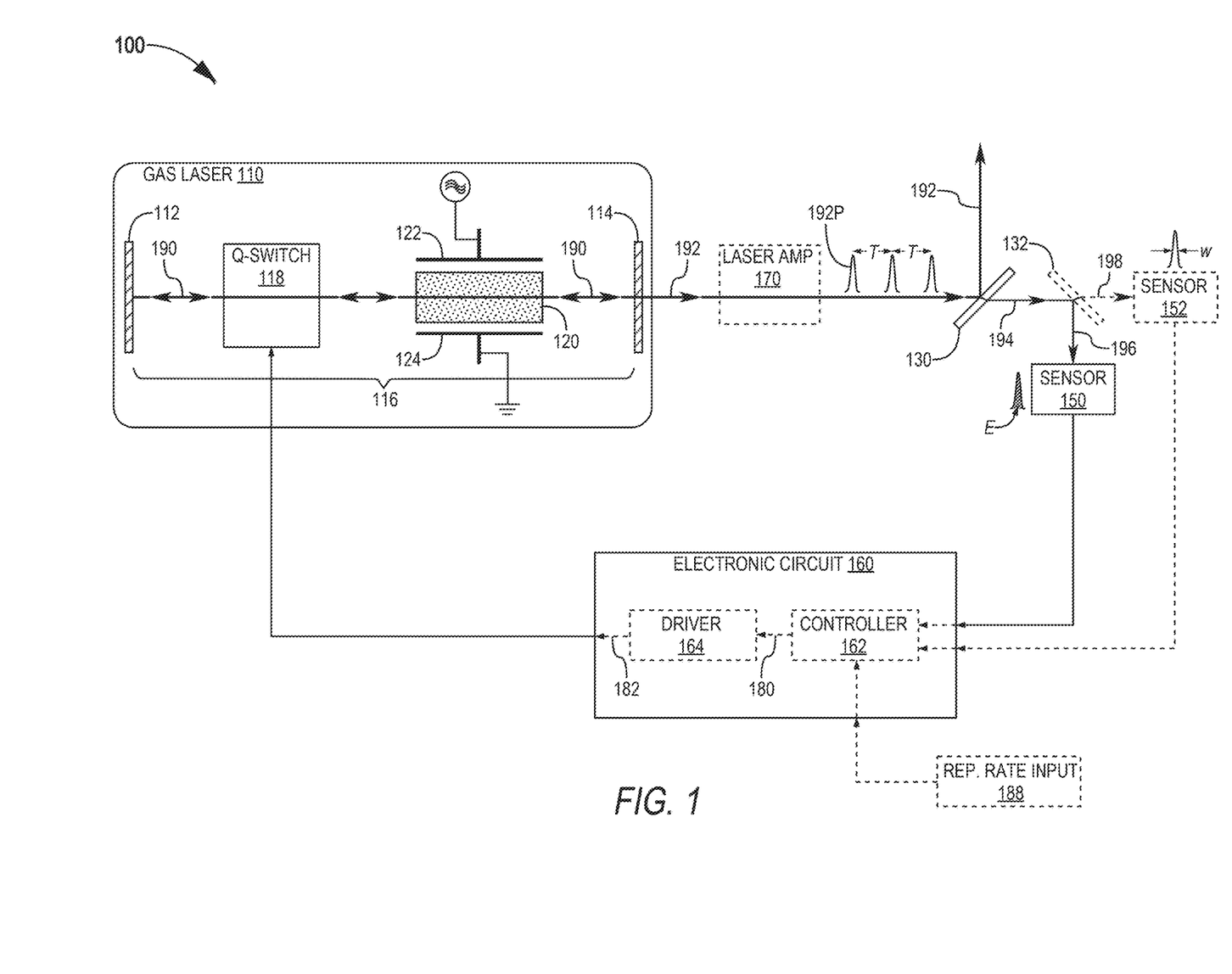
FIG. 1 illustrates a Q-switched gas laser apparatus with equalization of both laser pulse energy and laser pulse duration, according to an embodiment.

Referring now to the drawings, wherein like components are designated by like numerals, FIG. 1 illustrates one Q-switched gas laser apparatus 100 with bivariate pulse equalization. Apparatus 100 includes a gas laser 110, a sensor 150, and an electronic circuit 160. Gas laser 110 includes a laser resonator 116 having a Q-switch 118. Q-switch 118 is, for example, an AOM or an EOM.

Inherently, gas laser 110 also includes a gaseous gain medium 120. In one embodiment, gas laser 110 is a $CO_2$ or CO laser and gain medium 120 correspondingly includes $CO_2$ or CO. At least when gas laser 110 is a $CO_2$ or CO laser, gas laser 110 further includes one or more electrodes that apply a high voltage electric field through gain medium 120 to pump (energize) the $CO_2$ or CO molecules therein. In other embodiments, gas laser 110 may be a different type of gas laser with a long upper-state lifetime. Gas laser 110 may include electrodes 122 and 124 positioned on opposite sides of gain medium 120 to generate a discharge in gaseous gain medium 120. Electrode 122 is coupled to a high-voltage RF source, and electrode 124 is grounded.

In the example depicted in FIG. 1, resonator 116 is a linear resonator having two end-mirrors 112 and 114 with laser radiation 190 propagating back and forth therebetween. End-mirror 114 is an output coupler with partial reflectivity, for example in the range between 10% and 90%. End-mirror 112 may be a high-reflector with at least 99% reflectivity. In other examples of apparatus 100, resonator 116 is a linear resonator defined by more than two mirrors, with the propagation path of laser radiation 190 being folded. In yet other examples, resonator 116 is a ring resonator.

Q-switch 118 is placed in the propagation path of circulating laser radiation 190. Electronic circuit 160 controls the operation of Q-switch 118 to pulse laser radiation 190, such that gas laser 110 outputs a pulsed laser beam 192. More specifically, electronic circuit 160 operates Q-switch 118 to repeatedly switch resonator 116 between high-loss and low-loss states to set a repetition rate of laser pulses 192P of laser beam 192. Electronic circuit 160 is capable of varying the pulse repetition rate of laser beam 192 by varying the rate at which Q-switch 118 switches resonator 116 between the high-loss and low-loss states. In other words, electronic circuit 160 is capable of controlling Q-switch 118 to achieve a range of values of the period T between laser pulses 192P. Electronic circuit 160 may receive a repetition rate input 188 that indicates a desired repetition rate of laser pulses 192P. Electronic circuit 160 may receive repetition rate input 188 from an external control system or a user.

Electronic circuit 160 is also configured to control and vary the loss imposed by Q-switch 118 in the low-loss state of resonator 116, to achieve a target energy of laser pulses 192P. Q-switch 118, sensor 150, and electronic circuit 160 are arranged in an active feedback loop to exert servo control of the energy of laser pulses 192P. Apparatus 100 splits off a fraction 196 of laser beam 192 and directs laser beam fraction 196 to sensor 150. Sensor 150 measures the pulse energy E (or a related parameter) of laser pulses of laser beam fraction 196 to obtain a measure of the energy of laser pulses 192P (or another parameter indicative thereof). Sensor 150 communicates this pulse energy measurement to electronic circuit 160, and electronic circuit 160 adjusts the operation of Q-switch 118 accordingly to achieve a target pulse energy, at least to within some tolerance.

The property measured by sensor 150 may be an average energy of laser beam fraction 196 and may be obtained as an average over several or many laser pulses 192P. In one implementation, sensor 150 is a thermopile sensor, a photoconductive or photovoltaic semiconductor sensor, or a bolometric sensor. Alternatively, sensor 150 may be sufficiently fast to measure the energy of individual pulses in laser beam fraction 196. Apparatus 100 may include one or more beamsplitters to obtain laser beam fraction 196 from laser beam 192.

Electronic circuit 160 is further configured to control the duration of the low-loss state of resonator 116, defined by Q-switch 118, as needed to adjust the duration of laser pulses 192P. Electronic circuit 160 may perform this adjustment based on (a) a measurement of a duration of laser pulses 192P or (b) a pre-calibrated relationship between one or more of the pulse repetition rate, the target pulse energy, the pulse energy measurement obtained from sensor 150, and a target pulse duration.

Although not shown in FIG. 1, electronic circuit 160 may receive a target pulse energy and a target pulse duration from an external system or a user. Electronic circuit 160 may include one or more of discrete electronic components, integrated circuits, a microprocessor, and a software-equipped computer.

Certain embodiments of apparatus 100 include a sensor 152 and direct a fraction 198 of laser beam 192 to sensor 152. Sensor 152 obtains a measurement of the duration w of laser pulses 192P from laser beam fraction 198 and communicates this pulse-duration measurement to electronic circuit 160. Electronic circuit 160 may then adjust the operation of Q-switch 118 based on the pulse-duration measurement. Sensor 152 may complete an active feedback loop that allows servo control of the duration of laser pulses 192P to achieve a target pulse duration, at least to within some tolerance. Sensor 152 is, for example, a high-speed optical detector that records the waveform of individual laser pulses 192P.

Apparatus 100 may include one or more beamsplitters to split off a fraction of laser beam 192 to sensor 150 and optionally also to sensor 152. In the example depicted in FIG. 1, apparatus 100 includes (a) a beamsplitter 130 that splits off a fraction 194 of laser beam 192 toward sensors 150 and 152, and (b) a beamsplitter 132 that divides fraction 194 into laser beam fractions 196 and 198. Beamsplitter 132 may be omitted in embodiments that do not include sensor 152. Without departing from the scope hereof, apparatus 100 may implement other schemes to obtain laser beam fraction 196, and optionally laser beam fraction 198, from laser beam 192.

Electronic circuit 160 may include a controller 162 and a driver 164. Driver 164 generates an electrical drive signal 182 and supplies drive signal 182 to Q-switch 118 to modulate the resonator loss. For example, when Q-switch 118 is an AOM, driver 164 is an RF driver and drive signal 182 is a high-voltage RF signal. The generation of drive signal 182 by driver 164 is dictated by a command signal 180 received from controller 162. Command signal 180 defines the repetition rate of laser pulses 192P, the loss of resonator 116 in the low-loss state, and the duration of the low-loss state. For any given pulse repetition rate, controller 162 generates command signal 180 based at least in part on the pulse-energy measurement obtained from sensor 150 and optionally also based on the pulse-duration measurement obtained from sensor 152. The generation of command signal 180 by controller 162 is further based on the desired pulse repetition rate, for example as defined by repetition rate input 188.

In one embodiment, apparatus 100 is configured as a master oscillator power amplifier (MOPA). In this MOPA embodiment, gas laser 110 is the master oscillator and apparatus 100 further includes a laser amplifier 170 that amplifies laser beam 192. In the MOPA embodiment, sensor 150 and sensor 152 (if included) may be arranged to sample laser beam 192 before or after amplification by amplifier 170. It is generally advantageous to sample laser beam 192 after amplification, as depicted in FIG. 1. The fraction of laser beam 192 split off toward the sensor(s) may be insignificant when the splitting is after amplification. When the splitting is done prior to amplification, a greater fraction of laser beam 192 must be split of, and the impact on the final power of laser beam 192 delivered to an application (e.g., laser machining) may be significant. Additionally, since the amplified laser beam 192 is the output of MOPA, sampling of the amplified laser beam 192 provides a more direct evaluation of actual output, and the control exerted by electronic circuit 160 may compensate for effects induced in amplifier 170.

Figure 2:
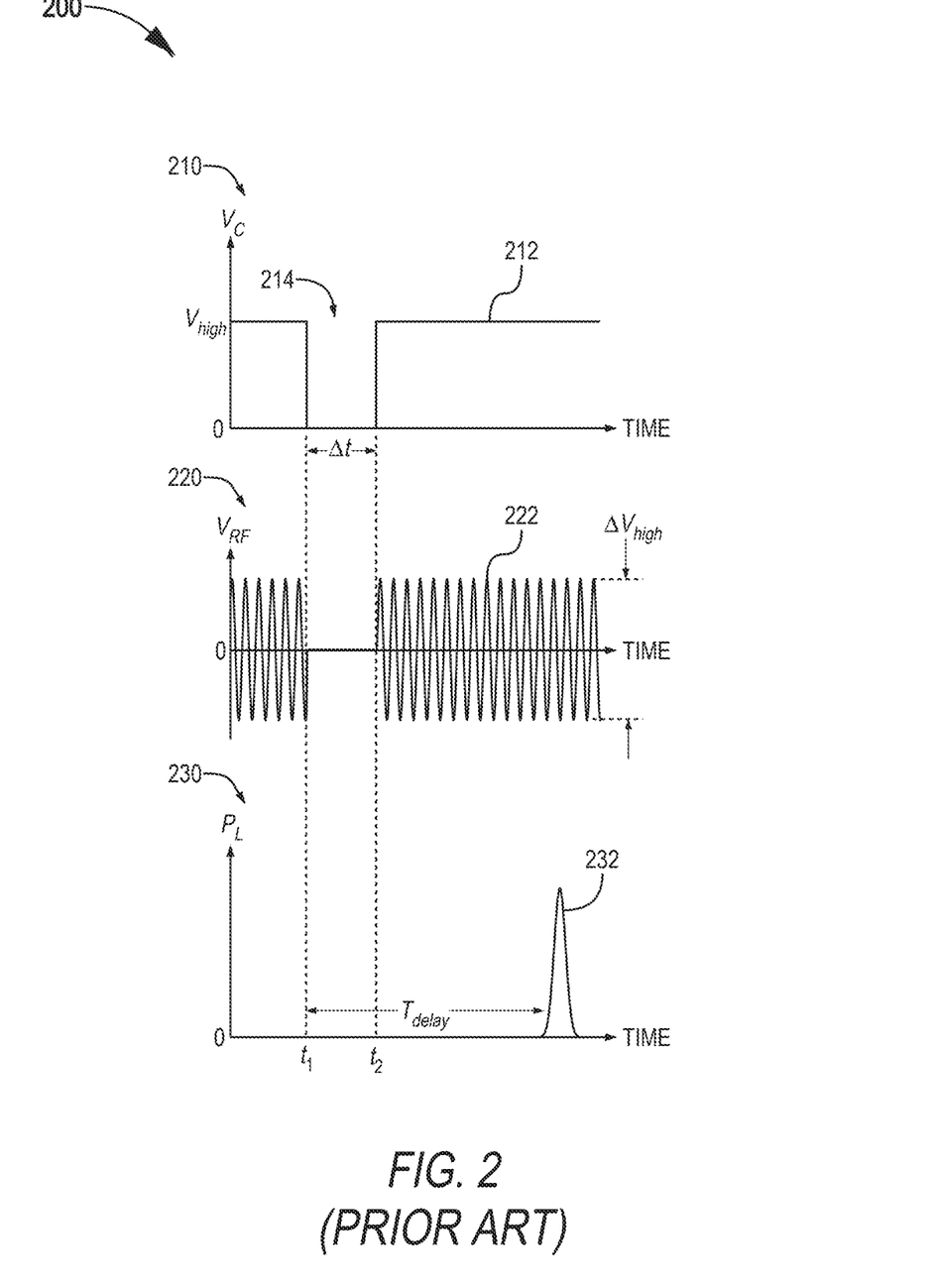
FIG. 2 is a timing diagram of a prior-art scheme for Q-switching a laser resonator equipped with an AOM Q-switch.

FIG. 2 is a timing diagram of a prior-art scheme 200 for Q-switching a laser resonator equipped with an AOM Q-switch. FIG. 2 shows three graphs 210, 220, 230 pertaining to the generation of a laser pulse 232. Graph 210 depicts the temporal evolution of a command signal 212 supplied to an RF driver for driving the AOM. Graph 220 depicts the temporal evolution of an RF drive signal 222 supplied to the AOM by the RF driver. RF drive signal 222 is defined by command signal 212. The value $V_C$ of command signal 212 switches between two values, $V_{high}$ and zero. When $V_C = V_{high}$, the RF voltage $V_{RF}$ of drive signal 222 has an amplitude $\Delta V_{high}$, and the associated diffraction by AOM imparts resonator loss such that the laser resonator is in a high-loss state. When $V_C$ is zero, $V_{RF}$ is zero such that the AOM is off, thereby placing the laser resonator in its low-loss state.

Graph 230 depicts the temporal evolution of the laser power $P_L$ circulating in the laser resonator. In scheme 200, a laser pulse 232 is generated by a command pulse 214 of command signal 212 dropping to $V_C=0$. Command pulse 214 has a duration $\Delta t$ between a leading edge at a time $t_1$ and a trailing edge at a time $t_2$. The duration $\Delta t$ of command pulse 214 defines the duration of the low-loss state of the laser resonator. Acoustic and optical delays impose a delay $T_{delay}$ from time $t_1$ to laser pulse 232. The acoustic delay corresponds to the acoustic wave in the AOM optic, which is generated up until time $t_1$, propagating from the transducer completely through the path of laser radiation 190. The optical delay corresponds to laser radiation initiated by spontaneous emission "building up" by stimulated emission during many round-trips through the energized resonator. In the scenario depicted in FIG. 2, the acoustic delay is longer than the optical delay, and therefore laser pulse 232 is generated after time $t_2$.

Electronic circuit 160 is capable of operating Q-switch 118 according to prior-art scheme 200. However, prior-art scheme 200 does not provide pulse equalization, and the energy and duration of laser pulses 192P would vary with the pulse repetition rate.

Figure 3:
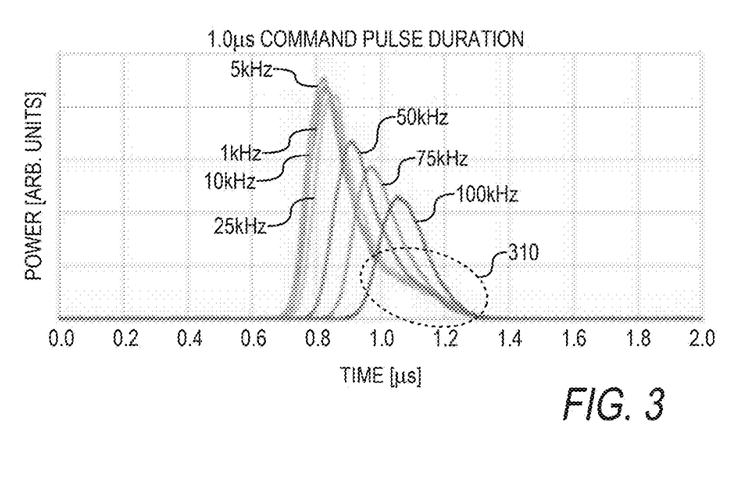
FIG. 3 shows a set of exemplary laser pulses generated by an embodiment of the FIG. 1 apparatus that implements an AOM Q-switch and is operated according to the prior-art scheme of FIG. 2.

FIG. 3 shows a set of exemplary laser pulses generated by an embodiment of apparatus 100 that implements Q-switch 118 as an AOM and is limited to operate according to prior-art scheme 200. The laser pulse waveforms are recorded by sensor 152 implemented as a high-speed optical detector that detects and records instantaneous laser power as a function of time. In the FIG. 3 example, the duration $\Delta t$ of command pulse 214 is 1.0 μs. FIG. 3 shows the resulting laser pulse waveform recorded at each of the pulse repetition rates 1 kHz, 5 kHz, 10 kHz, 25 kHz, 50 kHz, 75 kHz, and 100 kHz. While the laser pulse waveform is mostly unchanged for pulse repetition rates in the range from 1 kHz to 25 kHz, substantial changes occur as the pulse repetition rate is increased beyond 25 kHz. In particular, the pulse energy exhibits a strong decrease with pulse repetition rate for pulse repetition rates above 25 kHz. In addition, the shape and duration of the laser pulses change when the pulse repetition rate is increased above 25 kHz. The laser pulses generated at pulse repetition rates in the range 1-25 kHz are composed of a main pulse followed by a significant tail 310. As the pulse repetition rate is increased above 25 kHz, tail 310 gradually disappears and the laser pulse duration decreases correspondingly.

Figure 4:
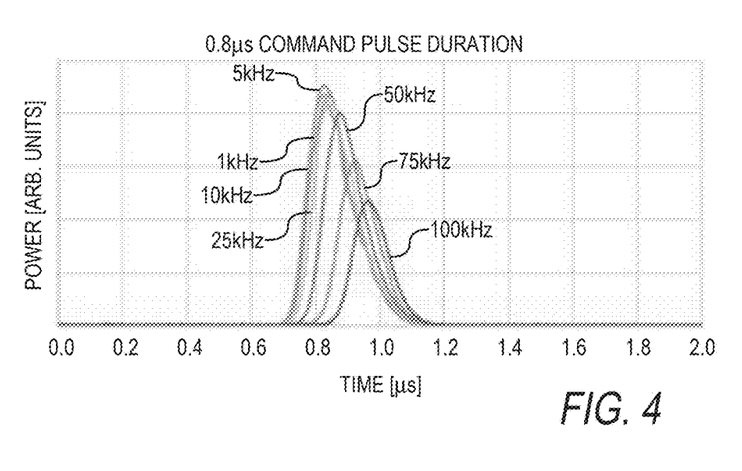
FIG. 4 shows another set of exemplary laser pulses generated by the same embodiment of the FIG. 1 apparatus as those of FIG. 3 but implementing pulse trimming in a deviation from the prior-art scheme of FIG. 2.

FIG. 4 shows another set of exemplary laser pulses generated by the same embodiment of apparatus 100 as those of FIG. 3 but using a shorter command pulse 214, a deviation from prior-art scheme 200. This technique is hereinafter referred to as "pulse trimming". In the FIG. 4 example, the duration $\Delta t$ of command pulse 214 is 0.8 μs. FIG. 4 shows the resulting laser pulse waveform recorded at each of the pulse repetition rates 1 kHz, 5 kHz, 10 kHz, 25 kHz, 50 kHz, 75 kHz, and 100 kHz. The reduction of command pulse 214 from 1.0 μs to 0.8 μs essentially eliminates tail 310 at all measured pulse repetition rates. However, the laser pulse energy still decreases dramatically when the pulse repetition rate is increased above 25 kHz. Thus, while pulse trimming may help achieve more uniform laser pulse duration and shape across a range of pulse repetition rates, pulse trimming does not equalize the laser pulse energy.

Figure 5:
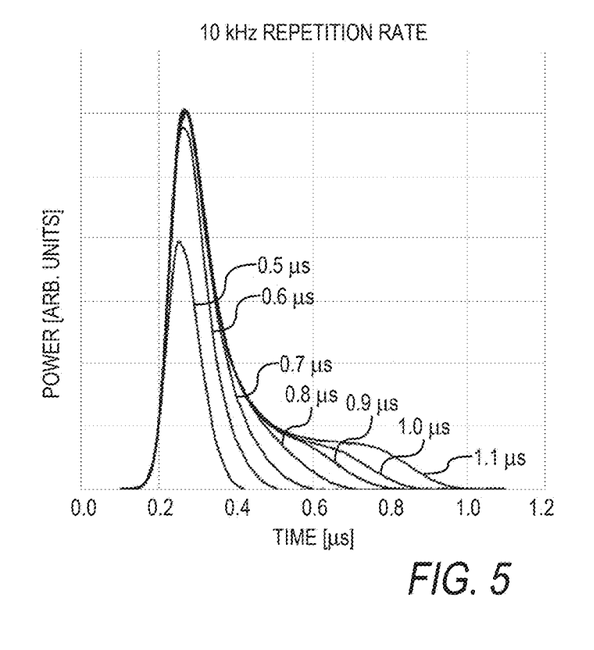
FIG. 5 displays data that further explore the effect of a command pulse duration, controlling the Q-switch, on laser pulse energy and duration at a fixed pulse repetition rate.

FIG. 5 further explores the effect of command pulse duration on laser pulse energy and duration at a fixed pulse repetition rate. FIG. 5 shows laser pulse waveforms obtained with different command pulse durations at a fixed pulse repetition rate. Each laser pulse waveform in FIG. 5 is labeled by the corresponding duration $\Delta t$ of command pulse 214. Starting with the longest command pulse duration of 1.1 μs, the laser pulse waveform exhibits a substantial pedestal-like tail. The main pulse has a width of about 0.2 pas, and the pedestal-like tail extends the total laser pulse duration by up to about 0.5 μs. As the command pulse duration is decreased from 1.1 μs, this tail is truncated and is essentially eliminated when the command pulse duration reaches 0.7 pls. When the command pulse duration is reduced below 0.7 μs, the laser pulse duration decreases further, now as a result of the width of the main pulse decreasing. In addition, the peak power of the laser pulse decreases.

The FIG. 5 data demonstrate that, at least in certain pulse-repetition-rate regimes, the laser pulse energy is sensitive to the duration of the low-loss state. The FIG. 5 data also show that, at least in certain pulse-repetition-rate regimes, only a fairly narrow range of command pulse durations provide a clean tail-free pulse while maintaining the full energy of the main pulse. In other words, there is an "optimal" command pulse duration, and even relatively small deviations from this optimal command pulse duration have significant effects. We have found that the optimal command pulse duration increases with pulse repetition rate, at least for pulse repetition rates above a certain threshold rate.

Together, the data of FIGS. 3, 4, and 5 demonstrate strongly coupled relationships between the repetition rate, energy, and duration of laser pulses generated by a Q-switched gas laser, such as gas laser 110. The nature of these relationships depends on the location in the three-dimensional parameter space spanned by pulse repetition rate, energy, and duration. Additionally, the relationships are sensitive to other parameters, including properties of resonator 116, gain medium 120, and the pumping of gain medium 120.

Figure 6:
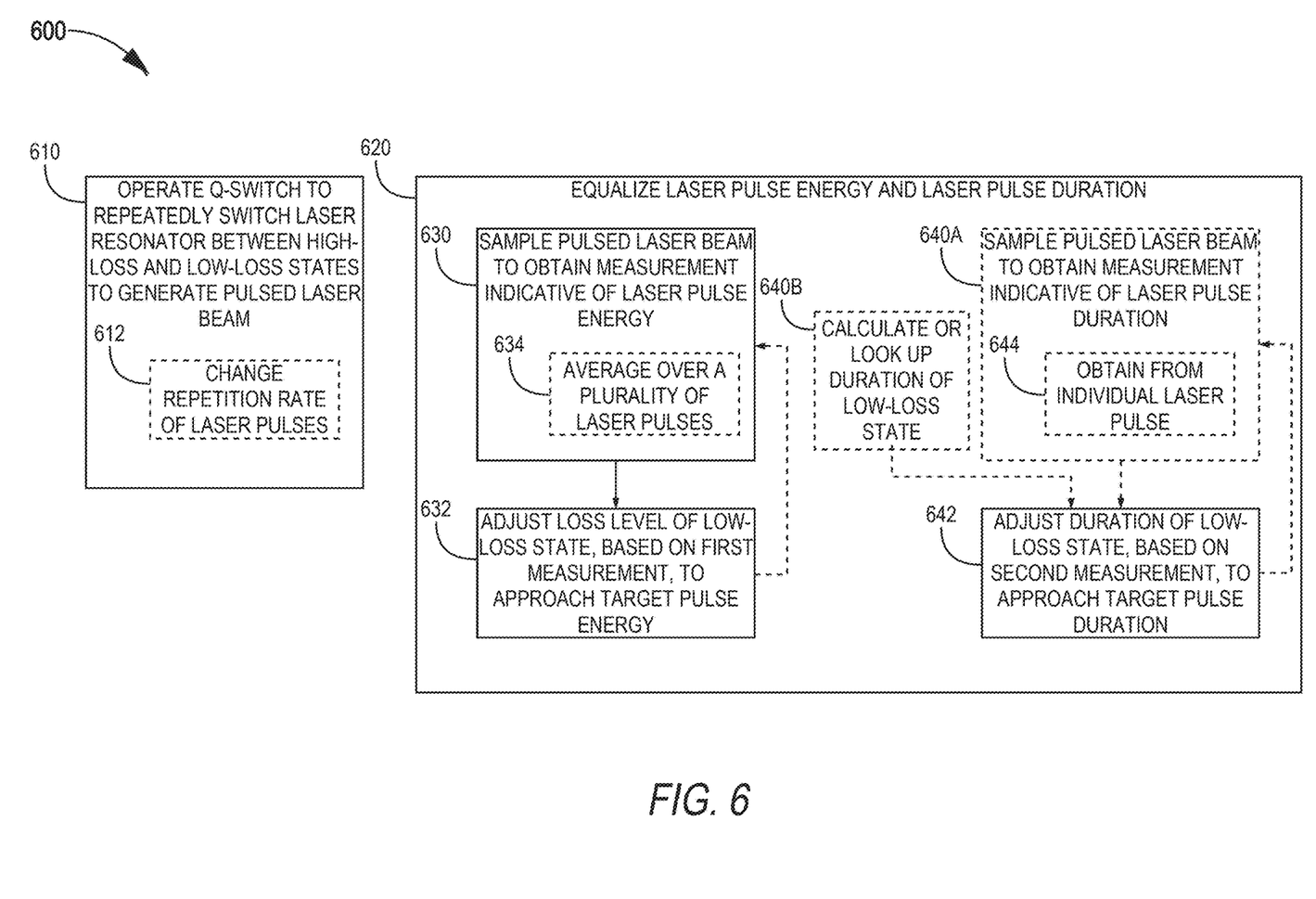
FIG. 6 is a flowchart for a method for bivariate equalization of laser pulses generated by a Q-switched gas laser, according to an embodiment.

FIG. 6 is a flowchart for one method 600 for bivariate equalization of laser pulses generated by a Q-switched gas laser. Method 600 may be applied to apparatus 100 and overcomes the issues illustrated by the data of FIGS. 3-5 to provide uniform laser pulse energy and duration over a wide range of pulse repetition rates. Method 600 entails operating the Q-switch according to a scheme that is more advanced than prior-art scheme 200. In the following, method 600 is discussed within the context of apparatus 100. Method 600 includes steps 610 and 620, performed in parallel.

In step 610, electronic circuit 160 operates Q-switch 118 to repeatedly switch resonator 116 between high-loss and low-loss states to generate pulsed laser beam 192, as discussed above in reference to FIG. 1. In step 620, electronic circuit 160 cooperates with sensor 150, and optionally also sensor 152, to equalize the energy and duration of laser pulses 192P across a range of pulse repetition rates.

Step 620 includes steps 630 and 632. In step 630, sensor 150 samples laser beam 192 to obtain a measurement indicative of the energy of laser pulse 192P, as discussed above in reference to FIG. 1. Step 630 may implement a step 634 of obtaining this pulse-energy measurement as an average over a plurality of laser pulses 192P. In step 632, electronic circuitry 160 adjusts the loss level of the low-loss state of resonator 116, based on the pulse-energy measurement obtained in step 630, to achieve or at least approach a target pulse energy. Steps 630 and 632 may be performed iteratively, in an active feedback loop, to achieve the target pulse energy. In an example scenario, step 620 achieves a laser pulse energy that is within 10% of the target pulse energy, with the laser pulse energy being evaluated as the energy of a single laser pulse or the average energy of a plurality of laser pulses.

Figure 7:
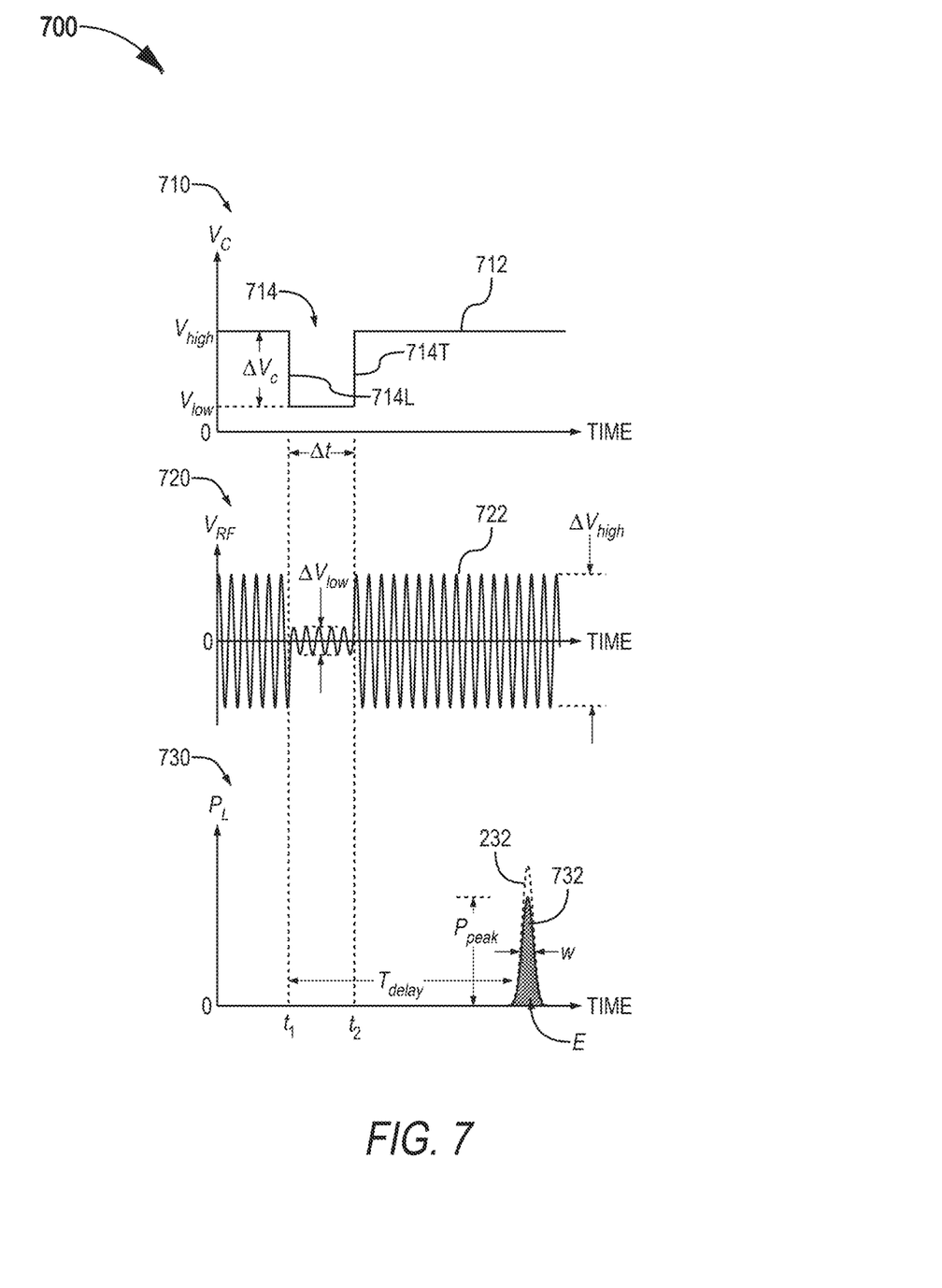
FIG. 7 is a timing diagram of a scheme utilized by the FIG. 6 method to Q-switch a gas laser with bivariate pulse equalization, according to an embodiment.

FIG. 7 is a timing diagram of one scheme 700 utilized by method 600 to Q-switch gas laser 110. Scheme 700 is a modification of scheme 200 that enables both pulse energy equalization and pulse duration equalization. FIG. 7 shows scheme 700 for an embodiment where Q-switching is performed with an AOM. Scheme 700 is readily adapted to other types of Q-switches, for example an EOM. Graphs 720 and 730 of FIG. 7 provide a more detailed example of step 632. Graph 720 depicts the temporal evolution of an RF drive signal 722 supplied to the AOM by electronic circuit 160. As compared to RF drive signal 222 of scheme 200, RF drive signal 722 is not necessarily zero during the low-loss state of resonator 116. Instead, RF drive signal 722 generally has a non-zero amplitude $\Delta V_{low}$ during the low-loss state, and electronic circuit 160 adjusts the value of $\Delta V_{low}$ based on the pulse-energy measurement obtained by sensor 150 in step 630.

Graph 730 depicts the temporal evolution of the laser power $P_L$ circulating in resonator 116. When the AOM is driven by RF drive signal 722, the drop of RF drive signal 722 from amplitude $\Delta V_{high}$ to a non-zero amplitude $\Delta V_{low}$ results in the generation of a laser pulse 732. As compared to laser pulse 232 (see FIG. 2) generated when dropping RF drive signal all the way to zero, laser pulse 732 has a lower peak power $P_{peak}$ and a lower pulse energy E. The reduction in pulse energy E (and peak power $P_{peak}$) is a consequence of the AOM imparting a non-zero diffractive loss during the low-loss state of resonator 116. In step 632, electronic circuit 160 adjusts $\Delta V_{low}$ as needed to achieve the target pulse energy. For example, when the pulse-energy measurement obtained from sensor 150 indicates that the energy of laser pulses 192P exceeds the target pulse energy, electronic circuit 160 may increase $\Delta V_{low}$ to increase the loss of the low-loss state of resonator 116. Conversely, when the pulse-energy measurement obtained from sensor 150 indicates that the energy of laser pulses 192P is less than the target pulse energy, electronic circuit 160 may decrease $\Delta V_{low}$.

Step 620 of method 600 also includes a step 642, wherein electronic circuit 160 adjusts the duration of the low-loss state of resonator 116 to achieve or at least approach a target pulse duration. Graphs 720 and 730 of FIG. 7 provide a more detailed example of step 642. In this example, electronic circuit 160 adjusts the duration $\Delta t$ of RF drive signal 722 having amplitude $\Delta V_{low}$. In another example, electronic circuit 160 reduces duration $\Delta t$ to prevent laser pulse 732 from having a tail, or increases duration $\Delta t$ to maximize the energy in a main pulse of laser pulse 732. In yet another example, electronic circuit 160 adjusts duration $\Delta t$ to achieve a target pulse duration, such as a certain full-width at half-maximum (FWHM) pulse duration.

In one embodiment of step 620, step 642 is preceded by a step 640A, wherein sensor 152 samples laser beam 192 to obtain a measurement indicative of the duration of laser pulses 192P, as discussed above in reference to FIG. 1. Step 640A may implement a step 644 of obtaining this pulse-duration measurement from a single laser pulse 192P, or as an average of several single-pulse durations. When step 620 includes step 640A, step 642 is based on the pulse-duration measurement obtained in step 640A. This embodiment may perform steps 640A and 642 iteratively in an active feedback loop. The pulse-duration feedback loop conducted by steps 640A and 642 may be faster than the pulse-energy feedback loop conducted by steps 630 and 632, especially when the laser pulse duration is obtained from the measurement of a single, or just a few, laser pulses 192P. In an example scenario, step 620 achieves a laser pulse duration that is within 10% of a target pulse duration.

In another embodiment of step 620, step 642 is preceded by a step 640B, wherein electronic circuit 160 either calculates the desired duration $\Delta t$ of the low-loss state of resonator 116, or retrieves the desired duration $\Delta t$ from a lookup table. Electronic circuit 160 may calculate the desired duration $\Delta t$ from a pre-calibrated functional relationship between (a) target pulse duration and (b) duration $\Delta t$ and pulse repetition rate and, optionally, also one or more other parameters of gas laser 110 and/or the target pulse energy. For example, it may be possible to achieve a constant laser pulse duration over a range of pulse repetition rates by adjusting duration $\Delta t$ in manner that depends linearly on the period T between laser pulses 192P (equivalent to the inverse of the pulse repetition rate). Alternatively, pre-calibrated durations $\Delta t$ as a function of target pulse duration, pulse repetition rate and, optionally, also one or more other parameters of gas laser 110 and/or the target pulse energy may be listed in a lookup table included in electronic circuit 160.

In one scenario, step 610 includes a step 612 of changing the repetition rate of laser pulses 192P. In this scenario, method 600 performs step 632, and optionally step 642, in response to the repetition rate change effected in step 612 so as to minimize changes to the laser pulse energy and laser pulse duration caused by the repetition rate change.

In embodiments where electronic circuit 160 includes controller 162 and driver 164, the execution of scheme 700 entails driver 164 generating RF drive signal 722 (an example of drive signal 182). Driver 164 generates RF drive signal 722 according to command signal 180 generated by controller 162. Graph 710 of FIG. 7 shows the temporal evolution of a command signal 712. Command signal 712 is one example of a command signal that can cause driver 164 to generate RF drive signal 722. Command signal 712 is a voltage $V_C$ that alternates between a high value $V_{high}$ and a low value $V_{low}$. When $V_C = V_{high}$, $V_{RF}$ has the amplitude $\Delta V_{high}$. When $V_C = V_{low}$, $V_{RF}$ has the amplitude $\Delta V_{low}$. The value of $V_{low}$ is a signal value that dictates the value of $\Delta V_{low}$. Each laser pulse 192P is generated after a command pulse 714 characterized by the signal value $V_{low}$. The value of $V_{low}$ controls the value of $\Delta V_{low}$ and thus the energy of laser pulse 192P.

Controller 162 may set the repetition rate of laser pulses 192P by setting a period between leading edges 714L of successive command pulses 714 to the inverse of the desired pulse repetition rate. In this case, controller 162 adjusts duration $\Delta t$ of the low-loss state of resonator 116 by adjusting the temporal position of the trailing edges 714T of command pulses 714.

Command signal 712 contains both timing information (times $t_1$ and $t_2$) and the variable voltage $V_{low}$. Alternatively, controller 162 may generate a command signal as two separate components, a timing signal and a variable DC voltage. The timing signal may be a transistor-transistor logic (TTL) signal containing TTL pulses similar to command pulses 714 but with a constant signal value $V_{low}$. The variable DC voltage may be an analog signal, for example a DC voltage of the value $V_{low}$, that dictates the amplitude $\Delta V_{low}$ or RF drive signal 722. Often, commercial RF drivers are configured for digital control, rather than analogue control. The command signal may be a digital signal, comprising a digitally encoded time $t_1$, delay $\Delta t$, voltage values $\Delta V_{high}$, and voltage value $\Delta V_{low}$.

Figure 8:
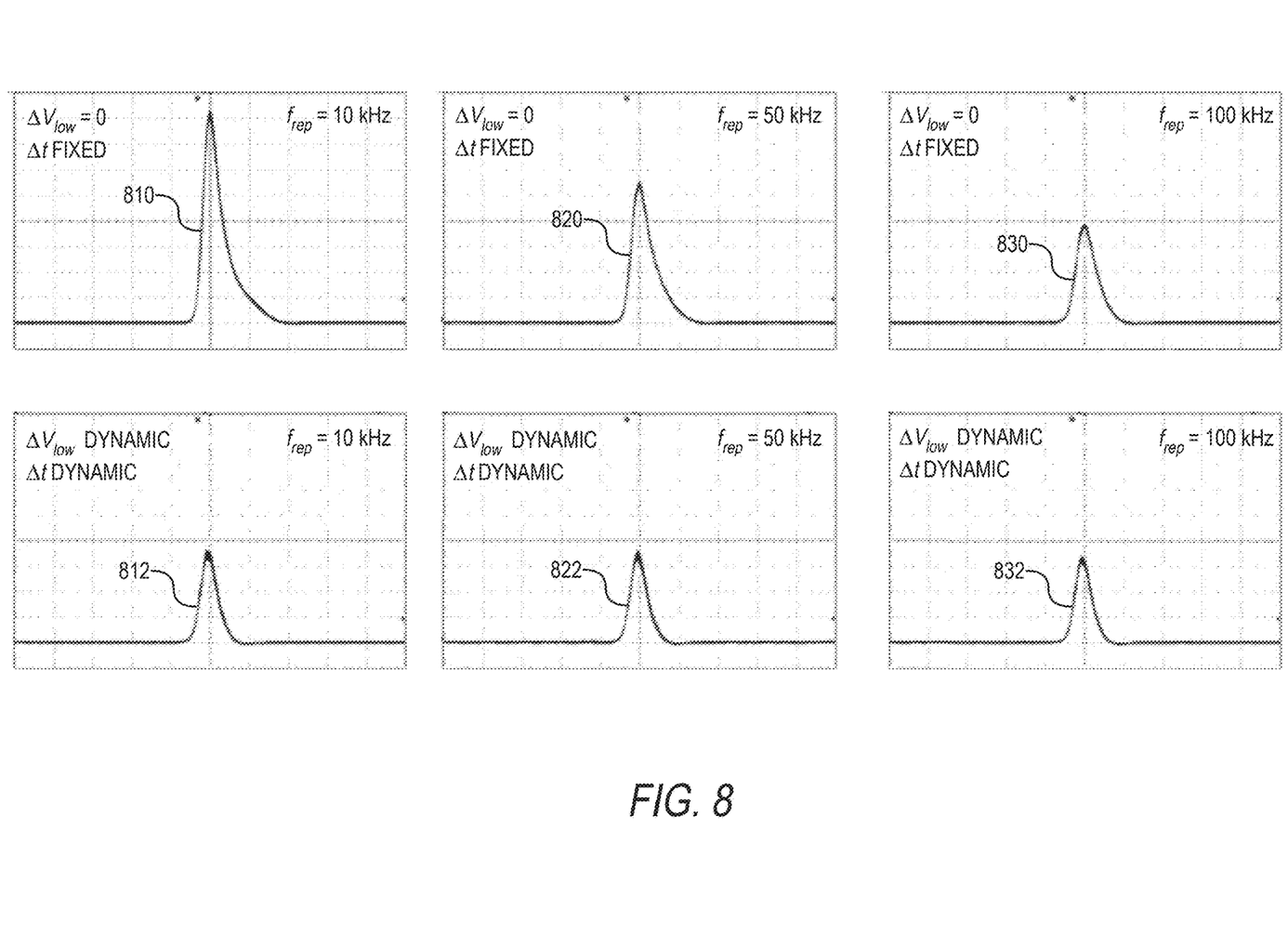
FIG. 8 shows examples of laser pulses generated when operating the FIG. 1 apparatus with bivariate pulse equalization according to the FIG. 7 scheme, and implementing dynamic adjustment of both laser pulse energy and laser pulse duration based on measurements from respective sensors, according to an embodiment. For comparison, FIG. 8 also shows examples of laser pulses generated without pulse equalization.

FIG. 8 shows examples of laser pulses 192P generated when operating apparatus 100 with bivariate pulse equalization according to scheme 700 and implementing dynamic adjustment of both laser pulse energy and laser pulse duration based on measurement from sensors 150 and 152. For comparison, FIG. 8 also shows examples of laser pulses generated when operating apparatus 100 according to prior-art scheme 200 without pulse equalization. FIG. 8 depicts oscilloscope traces of six laser pulse waveforms measured by sensor 152. Traces 810, 820, and 830 are obtained at respective pulse repetition rates 10 kHz, 50 kHz, and 100 kHz, using prior-art scheme 200. Thus, for traces 810, 820, and 830, $V_{low}$ is kept at zero and duration $\Delta t$ is kept constant. Traces 812, 822, and 832 are also obtained at respective pulse repetition rates 10 kHz, 50 kHz, and 100 kHz, but using pulse equalization according to scheme 700 with dynamic adjustment of both the signal value $V_{low}$ and duration $\Delta t$.

The measured pulse energies for traces 810, 820, and 830 are 704 microjoules (µJ), 542 µJ, and 355 µJ, respectively, and the corresponding FWHM pulse durations are 105 nanoseconds (ns), 118 ns, and 117 ns. It is clear that, without pulse equalization, the pulse energy changes dramatically when the pulse repetition rate is increased from 10 kHz to 100 kHz. In contrast, when implementing pulse equalization according to scheme 700, essentially identical laser pulse waveforms are obtained for all three pulse repetition rates, as evident from traces 812, 822, and 832. With pulse equalization, the measured pulse energies at 10 kHz, 50 kHz, and 100 kHz are 250 µJ, 254 µJ, and 262 µJ, respectively. Furthermore, each of the three pulses has a FWHM pulse duration of 99 ns.

Figure 9A:
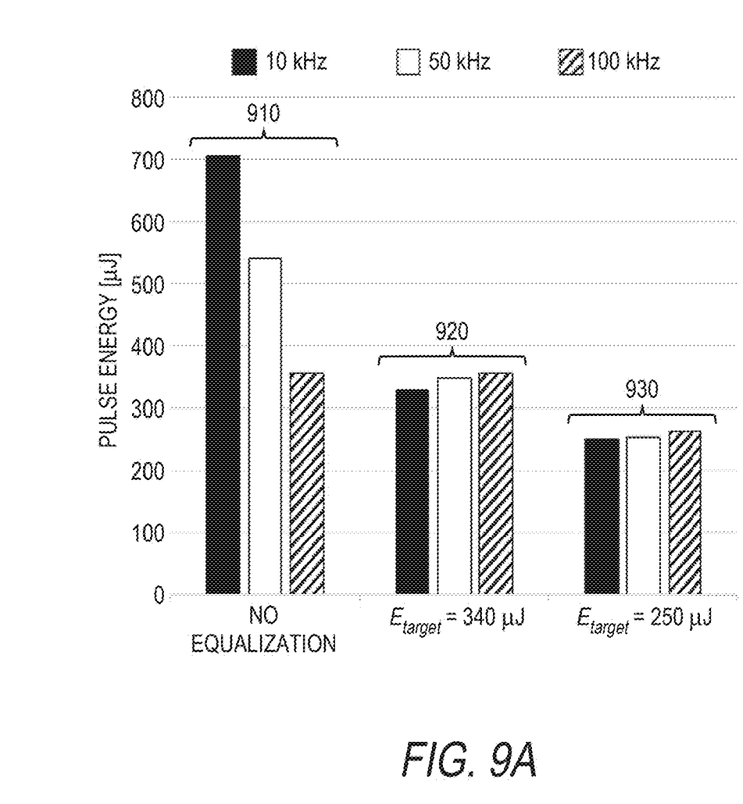
FIGS. 9A and 9B show examples of laser pulse energies and laser pulse durations, respectively, for three different pulse repetition rates, with and without bivariate pulse equalization.
Figure 9B:
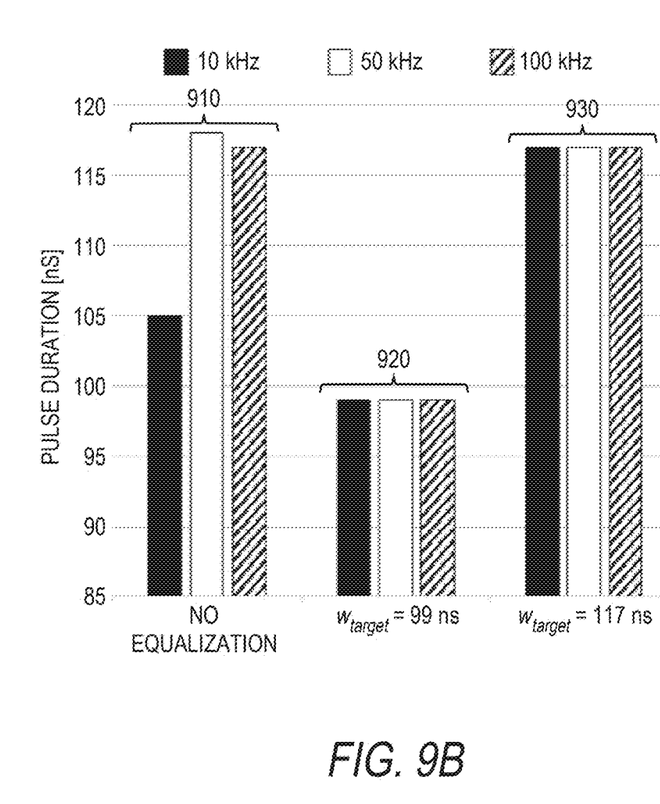

FIGS. 9A and 9B show examples of laser pulse energies and laser pulse durations, respectively, for three different pulse repetition rates, 10 kHz, 50 kHz, and 100 kHz, with and without bivariate pulse equalization. Dataset 910 is obtained without pulse equalization, that is, with $\Delta V_{low}=0$ and $\Delta t$ constant. Datasets 920 and 930 are obtained using bivariate pulse equalization according to scheme 700, with both $\Delta V_{low}$ and $\Delta t$ being dynamically adjusted based on measurements obtained from sensors 150 and 152. In the case of dataset 920, the target pulse energy $E_{target}$ was 340 µJ and the target pulse duration $w_{target}$ was 99 ns. In the case of dataset 930, the target pulse energy $E_{target}$ was 250 µJ and the target pulse duration $w_{target}$ was 117 ns.

Dataset 910 shows that, without pulse equalization, the laser pulse energy decreases rapidly with pulse repetition rate, with a 2× reduction from 10 kHz to 100 kHz. Additionally, the laser pulse duration is highly sensitive to the pulse repetition rate in a non-obvious manner. In contrast, as seen in datasets 920 and 930, bivariate pulse equalization is very effective. The target pulse duration is achieved at all three pulse repetition rates, and the pulse energy variation is small. For each of the two different target pulse energies, 340 and 250 µJ, each measured laser pulse energy is within 5% of the target pulse energy.

Figures 10A, 10B:
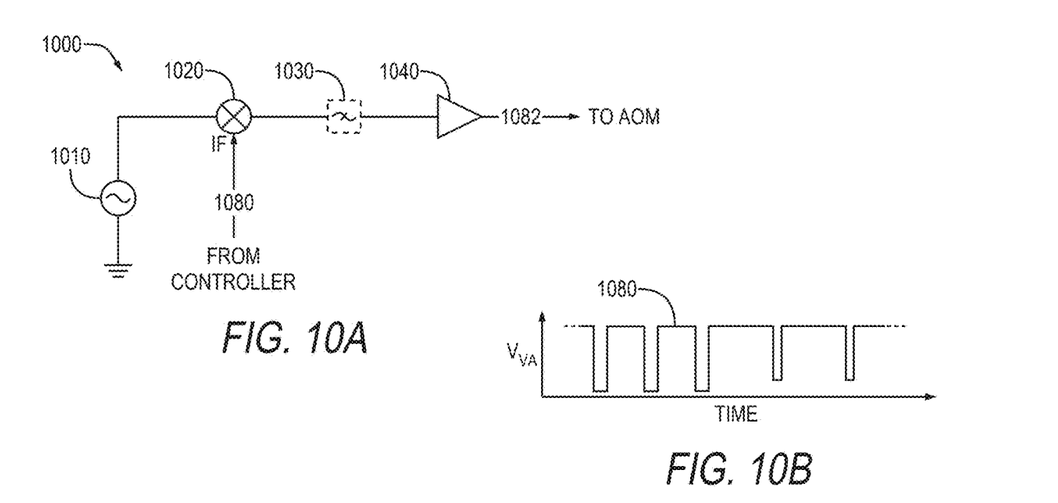
FIG. 10A illustrates an RF driver that may be implemented in embodiments of the FIG. 1 apparatus where the Q-switch is an AOM, according to an embodiment.
FIG. 10B illustrates an exemplary command signal for controlling this RF driver.

FIG. 10A illustrates one RF driver 1000 that may be implemented as driver 164 in embodiments of apparatus 100 where Q-switch 118 is an AOM. FIG. 10B illustrates an exemplary command signal 1080 that controls RF driver 1000. RF driver 1000 includes a RF oscillator 1010, a mixer 1020, and an amplifier 1040. RF oscillator 1010 generates an RF signal. Mixer 1020 receives this RF signal and further receives command signal 1080 at an "IF" port of mixer 1020. Command signal 1080 is a variable analog voltage $V_{VA}$ composed of successive instances of command signal 712 to define the repetition rate of laser pulses 192P, $V_{low}$, and duration $\Delta t$ (see FIG. 7). Command signal 1080 is generated by an example of controller 162. Mixer 1020 modulates the RF signal from RF oscillator 1010 according to command signal 1080. Amplifier 1040 amplifies this modulated RF signal to generate an RF drive signal 1082 for driving the AOM Q-switch. RF drive signal 1082 is equivalent to successive instances of RF drive signal 722. RF driver 1000 may further include a low-pass filter 1030 that filters out undesirable harmonics generated by mixer 1020.

Figures 11A, 11B:
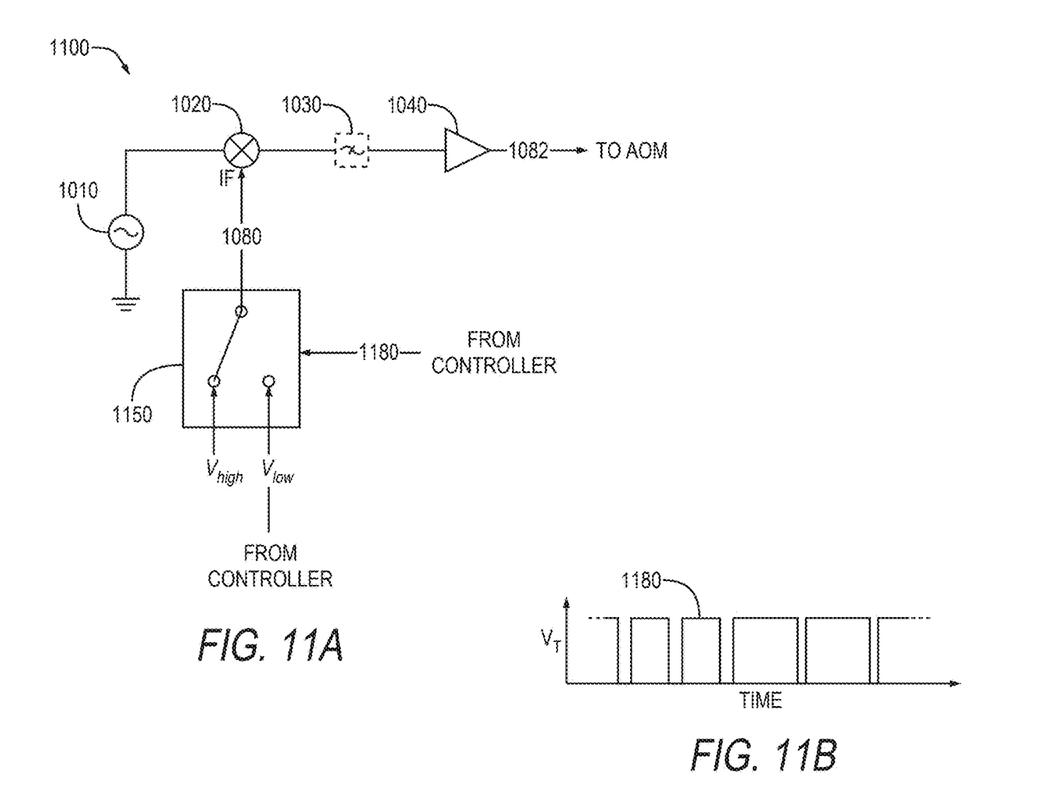
FIG. 11A illustrates another RF driver that may be implemented in embodiments of the FIG. 1 apparatus where the Q-switch is an AOM, according to an embodiment. This RF driver is configured to receive separate timing and voltage inputs.
FIG. 11B illustrates an exemplary timing command signal for controlling the timing aspect of the RF driver of FIG. 11A.

FIG. 11A illustrates another RF driver 1100 configured to receive separate timing and voltage inputs. FIG. 11B illustrates an exemplary timing command signal 1180 that controls the timing aspect of RF driver 1100. RF driver 1100 is similar to RF driver 1000 except for further including a digitally controlled analog switch 1150 coupled to the IF port of mixer 1020. Analog switch 1150 has two analog voltage input ports. One port is kept at the voltage $V_{high}$, and the other receives $V_{low}$ from an example of controller 162. Analog switch 1150 also receives a separate timing command signal 1180 from controller 162. Timing command signal 1180 is similar to command signal 1080 except for being a digital signal attaining only two values, low and high, without carrying information about $V_{low}$. Analog switch 1150 switches between $V_{high}$ and $V_{low}$ according to timing command signal 1180, thereby generating command signal 1080.

Figure 12:
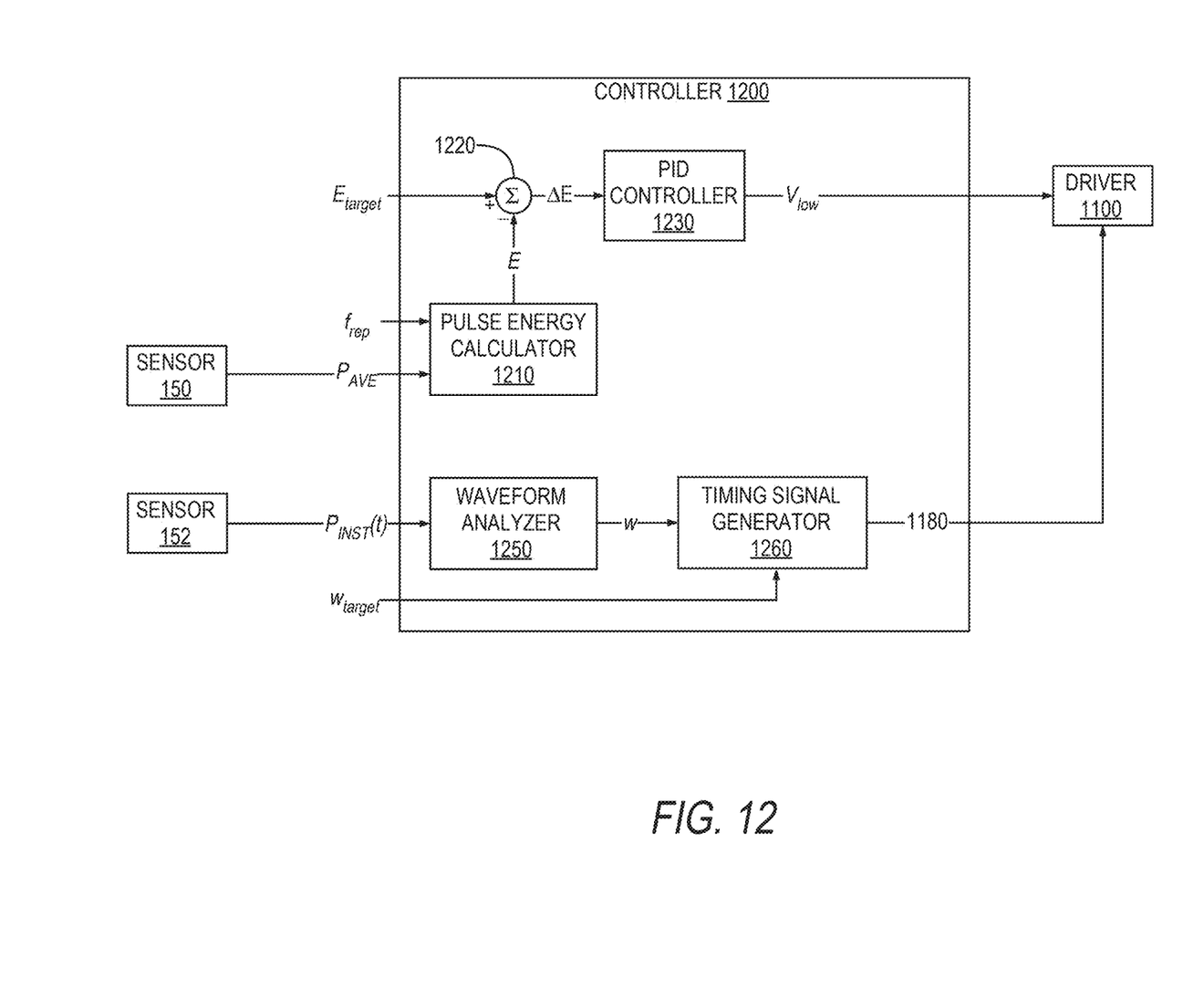
FIG. 12 illustrates a controller for bivariate pulse equalization with servo control of both laser pulse energy and laser pulse duration, according to an embodiment.

FIG. 12 illustrates one controller 1200 for bivariate pulse equalization with servo control of both laser pulse energy and laser pulse duration. Controller 1200 is an embodiment of controller 162 and may be implemented in electronic circuit 160 together with RF driver 1100. Controller 1200 receives an average-power measurement $P_{AVE}$ of laser beam 192 from sensor 150 and a laser pulse waveform of a laser pulse 192P from sensor 152. The laser pulse waveform is an instantaneous laser power as a function of time, $P_{INST}(t)$. Controller 1200 processes $P_{AVE}$ and $P_{INST}(t)$ to generate $V_{low}$ and timing command signal 1180, respectively, and then communicates $V_{low}$ and timing command signal 1180 to RF driver 1100. The processing of $P_{AVE}$ serves to achieve a target pulse energy $E_{target}$, and the processing of $P_{INST}(t)$ serves to achieve a target pulse duration $w_{target}$. (There may some degree of coupling between laser pulse energy and laser pulse duration, as discussed above in reference to FIGS. 3-5.)

For the purpose of pulse energy equalization, controller 1200 includes a pulse energy calculator 1210, a summing node 1220, and a proportional-integral-derivative (PID) controller 1230. Pulse energy calculator 1210 calculates the pulse energy E from the average-power measurement $P_{AVE}$ and the pulse repetition rate $f_{rep}$. Pulse repetition rate $f_{rep}$ may be received from an external source/signal or defined internally in controller 1200. Summing node 1220 evaluates the difference $\Delta E$ between the calculated pulse energy E and the target pulse energy $E_{target}$, and generates an error signal indicative of $\Delta E$. PID controller 1230 then determines and outputs a new $V_{low}$ to reduce $\Delta E$.

PID control is just one example of feedback algorithms that may be employed by apparatus 100 and method 600. Alternatively, apparatus 100 and method 600 may employ a different feedback algorithm known in the art. Accordingly, PID controller 1230 may be replaced by another type of servo controller employing a different principle for minimizing an error signal.

For the purpose of pulse duration equalization, controller 1200 includes a waveform analyzer 1250 and a timing signal generator 1260. Waveform analyzer 1250 analyzes a laser pulse waveform $P_{INST}(t)$ to derive a laser pulse duration w. Timing signal generator 1260 then compares this measured laser pulse duration w to the target pulse duration $w_{target}$, and adjusts timing command signal 1180 to minimize the difference therebetween. Specifically, timing signal generator 1260 adjusts the duration Δt, as discussed above in reference to FIGS. 6 and 7. Timing signal generator 1260 then communicates timing command signal 1180 to RF driver 1100.

Whereas each iteration of adjustment of $V_{low}$ is based on a sampling of a series of laser pulses 192P, each iteration of adjustment of timing command signal 1180 may be based on a single laser pulse 192P and may therefore be performed on a much shorter timescale.

The above discussion based on FIGS. 7, 10A, 10B, 11A, 11B, and 12 pertains to AOM-based Q-switching. These embodiments may be modified for other types of Q-switching by changing the drive signal for the Q-switch accordingly. For example, when Q-switch 118 is an EOM, the RF drive signals discussed above are replaced by DC drive signals.

The present invention is described above in terms of a preferred embodiment and other embodiments. The invention is not limited, however, to the embodiments described and depicted herein. Rather, the invention is limited only by the claims appended hereto.

What is claimed is:

1. A Q-switched gas laser apparatus with pulse equalization, comprising:
   a gas laser including a laser resonator having a Q-switch operable to switch the laser resonator between a high-loss state and a low-loss state to generate a pulsed laser beam;
   a first sensor for obtaining a first measurement of the pulsed laser beam indicative of a laser pulse energy;
   a second sensor for obtaining a second measurement of the pulsed laser beam indicative of a laser pulse duration; and
   an electronic circuit communicatively coupled between the Q-switch and the first sensor and the second sensor and configured to operate the Q-switch to (a) repeatedly switch the laser resonator between the high-loss and low-loss states to set a repetition rate of laser pulses of the pulsed laser beam, (b) adjust a loss level of the low-loss state, based on the first measurement, to achieve a target laser pulse energy, and (c) adjust, based on the second measurement, a duration of the low-loss state to achieve a target laser pulse duration.

2. The apparatus of claim 1, wherein the first and second sensors are arranged to sample the pulsed laser beam outside the laser resonator.

3. The apparatus of claim 1, wherein the electronic circuit completes a pulse-energy feedback loop between the first sensor and the Q-switch, and a pulse-duration feedback loop between the second sensor and the Q-switch.

4. The apparatus of claim 3, wherein the pulse-duration feedback loop is faster than the pulse-energy feedback loop.

5. The apparatus of claim 3, wherein the first sensor is a photosensitive detector configured to obtain the first measurement as an average over a plurality of the laser pulses, and the second sensor is an optical detector configured to obtain the second measurement as a waveform of an individual laser pulse.

6. The apparatus of claim 1, wherein the Q-switch includes an acousto-optic modulator disposed in the laser resonator.

7. The apparatus of claim 6, wherein the electronic circuit includes:
   an RF-driver for generating and supplying to the acousto-optic modulator a radio-frequency signal that, when of non-zero amplitude, causes the acousto-optic modulator to introduce loss in the resonator by diffraction; and
   a controller for generating and sending to the RF-driver a command signal including a series of command pulses having respective leading edges, trailing edges, and signal values, each leading edge causing the RF-driver to generate the radio-frequency signal with a lower amplitude that puts the laser resonator in the low-loss state, each trailing edge causing the RF-driver to generate the radio-frequency signal with a higher amplitude that puts the laser resonator in the high-loss state, and each signal value setting the value of the lower amplitude;
   wherein the controller is configured to (a) set the repetition rate by setting a period between successive leading edges to match the inverse of a target repetition rate, (b) adjust the signal value based on the first measurement to achieve the target laser pulse energy, and (c) adjust a duration from the leading edge to the corresponding trailing edge to achieve the target laser pulse duration.

8. The apparatus of claim 1, further comprising a laser power amplifier for amplifying the pulsed laser beam, wherein the first sensor is arranged to obtain the first measurement from the pulsed laser beam after amplification by the laser power amplifier.

9. A method for equalizing laser pulses generated by a Q-switched gas laser, comprising steps of:
   operating a Q-switch of the Q-switched gas laser to repeatedly switch a laser resonator of the Q-switched gas laser between high-loss and low-loss states to generate a pulsed laser beam; and
   equalizing laser pulse energy and laser pulse duration of laser pulses of the pulsed laser beam through repeated steps of:
      sampling the pulsed laser beam to obtain a first measurement indicative of the laser pulse energy and to obtain a second measurement of the laser beam indicative of the laser pulse duration,
      adjusting a loss level of the low-loss state, based on the first measurement, to approach a target laser pulse energy, and
      adjusting, based on the second measurement, a duration of the low-loss state to approach a target laser pulse duration.

10. The method of claim 9, wherein each instance of the first measurement is obtained as an average over a plurality of the laser pulses, and each instance of the second measurement is obtained from an individual laser pulse.

11. The method of claim 9, wherein:
   the operating step includes a step of changing a repetition rate of the laser pulses from a first value to a second value that is different from the first value; and
   the equalizing step includes performing the adjusting steps in response to the changing step so as to minimize changes to the laser pulse energy and laser pulse duration caused by the changing step.

12. The method of claim 11, wherein the equalizing step includes:
   maintaining, to within 10 percent, the same individual or averaged laser pulse energy at the second value of the repetition rate as at the first value of the repetition rate; and maintaining, to within 10 percent, the same laser pulse duration at the second value of the repetition rate as at the first value of the repetition rate.

13. The method of claim 9, wherein:

the operating step includes:
  generating a command signal including a series of command pulses having respective leading edges, trailing edges, and signal values, each leading edge initiating a transition of the laser resonator into the low-loss state, each trailing edge initiating a transition of the laser resonator into the high-loss state, each signal value defining the loss level of the laser resonator during the low-loss state, and
  setting a repetition rate of the laser pulses by setting a period between successive leading edges to match the inverse of a target repetition rate;
the adjusting loss level step includes adjusting the signal value based on the first measurement; and
the adjusting duration step includes adjusting a duration from the leading edge to the corresponding trailing edge based on the second measurement.

14. The method of claim 9, further comprising a step of amplifying the pulsed laser beam; and
wherein the sampling step is performed on the pulsed laser beam after amplification thereof.

15. The method of claim 9, wherein the Q-switch is an acousto-optic modulator.

16. The method of claim 15, wherein the operating step includes driving the acousto-optic modulator to diffract laser light out of the laser resonator, with the loss level resulting therefrom being non-zero in the low-loss state.

17. The method of claim 9, wherein the sampling step is performed outside the laser resonator.

* * * * *